US008556011B2

(12) United States Patent
Anwar et al.

(10) Patent No.: US 8,556,011 B2
(45) Date of Patent: Oct. 15, 2013

(54) PREDICTION STRATEGY FOR THERMAL MANAGEMENT AND PROTECTION OF POWER ELECTRONIC HARDWARE

(75) Inventors: Mohammad N Anwar, Van Buren Township, MI (US); Prakash Haribhai Desai, Troy, MI (US); Sean E Gleason, West Bloomfield, MI (US); Brian A Welchko, Torrance, CA (US)

(73) Assignees: GM Global Technology Operations LLC, Detroit, MI (US); Daimler AG, Stuttgart (DE); Chrysler Group LLC, Auburn Hills, MI (US); Bayerusche Motoren Werke Aktiengesellschaft, Munich (DE)

( * ) Notice: Subject to any disclaimer, the term of this patent is extended or adjusted under 35 U.S.C. 154(b) by 1393 days.

(21) Appl. No.: 12/255,728

(22) Filed: Oct. 22, 2008

(65) Prior Publication Data

US 2009/0115491 A1 May 7, 2009

Related U.S. Application Data

(60) Provisional application No. 60/984,475, filed on Nov. 1, 2007.

(51) Int. Cl.
*B60W 20/00* (2006.01)
(52) U.S. Cl.
USPC .................................................. 180/65.275
(58) Field of Classification Search
USPC ........................ 180/65.275; 62/376
See application file for complete search history.

(56) References Cited

U.S. PATENT DOCUMENTS

| | | | | |
|---|---|---|---|---|
| 4,806,839 A | * | 2/1989 | Nagato et al. | 318/798 |
| 5,040,381 A | * | 8/1991 | Hazen | 62/3.2 |
| 5,251,588 A | * | 10/1993 | Tsujii et al. | 123/142.5 R |
| 5,380,956 A | * | 1/1995 | Loo et al. | 174/252 |
| 6,219,245 B1 | * | 4/2001 | Nagashima et al. | 361/705 |
| 6,717,812 B1 | * | 4/2004 | Pinjala et al. | 361/699 |
| 6,832,148 B1 | | 12/2004 | Bennett | |
| 6,868,318 B1 | | 3/2005 | Cawthorne | |
| 7,154,236 B1 | | 12/2006 | Heap | |
| 7,210,304 B2 | * | 5/2007 | Nagashima | 62/259.2 |
| 7,230,334 B2 | * | 6/2007 | Andry et al. | 257/713 |
| 7,443,116 B2 | * | 10/2008 | Kutsuna et al. | 318/139 |
| 7,848,902 B2 | * | 12/2010 | Zettel et al. | 702/136 |
| 8,106,505 B2 | * | 1/2012 | Bernstein et al. | 257/713 |
| 2001/0015631 A1 | * | 8/2001 | Shimane et al. | 318/280 |
| 2002/0073726 A1 | * | 6/2002 | Hasebe et al. | 62/323.1 |
| 2003/0057914 A1 | * | 3/2003 | Kamatsu et al. | 318/727 |
| 2003/0227764 A1 | * | 12/2003 | Korczynski | 361/826 |
| 2004/0134204 A1 | * | 7/2004 | Honda | 62/134 |
| 2004/0163861 A1 | * | 8/2004 | Fukuda et al. | 180/65.2 |
| 2004/0178756 A1 | * | 9/2004 | Zhenxing | 318/432 |
| 2005/0076958 A1 | | 4/2005 | Foster | |
| 2005/0077867 A1 | | 4/2005 | Cawthorne | |
| 2005/0077877 A1 | | 4/2005 | Cawthorne | |
| 2005/0080523 A1 | | 4/2005 | Bennett | |

(Continued)

*Primary Examiner* — J. Allen Shriver, II
*Assistant Examiner* — Travis Coolman

(57) ABSTRACT

A hybrid powertrain system includes an engine, an electric machine, a power electronics device including a plurality of electric circuit layers, and a cooling system. A method for managing thermal energy in the power electronics device includes monitoring a plurality of temperature sensors in the power electronics device, monitoring electric power into and out of the power electronics device, predicting temperatures for the plurality of electric circuit layers, and controlling the hybrid powertrain system based upon the predicted temperatures for the plurality of electric circuit layers.

16 Claims, 3 Drawing Sheets

(56) References Cited

U.S. PATENT DOCUMENTS

| Publication No. | Date | Name | Ref |
|---|---|---|---|
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0114068 A1* | 5/2005 | Chey et al. | 702/130 |
| 2005/0173179 A1* | 8/2005 | Amanuma et al. | 180/247 |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0174642 A1* | 8/2006 | Nagashima et al. | 62/259.2 |
| 2006/0194670 A1 | 8/2006 | Heap | |
| 2007/0078580 A1 | 4/2007 | Cawthorne | |
| 2007/0093953 A1 | 4/2007 | Heap | |
| 2007/0114965 A1* | 5/2007 | Kutsuna et al. | 318/807 |
| 2007/0149348 A1 | 6/2007 | Holmes | |
| 2007/0191181 A1 | 8/2007 | Burns | |
| 2007/0195557 A1* | 8/2007 | Su | 363/17 |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0010036 A1* | 1/2008 | Swahn et al. | 702/132 |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Zettel | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0179736 A1* | 7/2008 | Hartwell et al. | 257/714 |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0051307 A1* | 2/2009 | Katsuyama et al. | 318/472 |
| 2009/0067202 A1* | 3/2009 | Ichikawa et al. | 363/79 |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1* | 4/2009 | West et al. | 477/98 |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0109624 A1* | 4/2009 | Chan et al. | 361/702 |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0118074 A1 | 5/2009 | Zettel | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 | 5/2009 | Kaminsky | |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |
| 2009/0118090 A1 | 5/2009 | Heap | |
| 2009/0118091 A1 | 5/2009 | Lahti | |
| 2009/0118093 A1 | 5/2009 | Heap | |
| 2009/0118094 A1 | 5/2009 | Hsieh | |
| 2009/0118877 A1 | 5/2009 | Center | |
| 2009/0118879 A1 | 5/2009 | Heap | |
| 2009/0118880 A1 | 5/2009 | Heap | |
| 2009/0118882 A1 | 5/2009 | Heap | |

(56) References Cited

U.S. PATENT DOCUMENTS

| | | |
|---|---|---|
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0130538 A1* | 5/2009 | Kaita et al. ............ 429/50 |
| 2009/0144002 A1 | 6/2009 | Zettel |
| 2009/0195093 A1* | 8/2009 | Bandai et al. .......... 310/54 |
| 2010/0089669 A1* | 4/2010 | Taguchi ............... 180/65.1 |

\* cited by examiner

PREDICTION STRATEGY FOR THERMAL MANAGEMENT AND PROTECTION OF POWER ELECTRONIC HARDWARE

CROSS REFERENCE TO RELATED APPLICATIONS

This application claims the benefit of U.S. Provisional Application No. 60/984,475 filed on Nov. 1, 2007 which is hereby incorporated herein by reference.

TECHNICAL FIELD

This disclosure is related to control systems for electromechanical transmissions, and thermal management systems therefor.

BACKGROUND

The statements in this section merely provide background information related to the present disclosure and may not constitute prior art.

Powertrain architectures comprise torque-generative devices, including internal combustion engines and electric machines, which transmit torque through a transmission device to an output. One exemplary transmission is a two-mode, compound-split, electromechanical transmission which utilizes an input member for receiving motive torque from a prime mover power source, for example an internal combustion engine, and an output member for delivering motive torque from the transmission to a vehicle driveline. Electric machines, operable as motors or generators, generate a torque input to the transmission, independently of a torque input from the internal combustion engine. The electric machines may transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission operating state and gear shifting, controlling the torque-generative devices, and regulating the electrical power interchange between the electrical energy storage device and the electric machines.

During operation of the electric machines, heat is generated in the various electric power devices, including the electric machines, power inverters, and electrical energy storage devices, e.g., high voltage batteries. Heat transfer devices, including heat sinks, heat exchangers, and cooling systems may be incorporated to manage waste heat in the system. Known systems include closed-circuit cooling systems which flow liquid coolant over heat sinks and pump the coolant through a heat exchanger to remove the waste heat. Other known systems include fan devices which pass air over the heat sink devices to remove heat therefrom.

SUMMARY

A hybrid powertrain system includes an engine, an electric machine, a power electronics device including a plurality of electric circuit layers, and a cooling system. A method for managing thermal energy in the power electronics device includes monitoring a plurality of temperature sensors in the power electronics device, monitoring electric power into and out of the power electronics device, predicting temperatures for the plurality of electric circuit layers, and controlling the hybrid powertrain system based upon the predicted temperatures for the plurality of electric circuit layers.

BRIEF DESCRIPTION OF THE DRAWINGS

One or more embodiments will now be described, by way of example, with reference to the accompanying drawings, in which.

DETAILED DESCRIPTION

Figure 1:
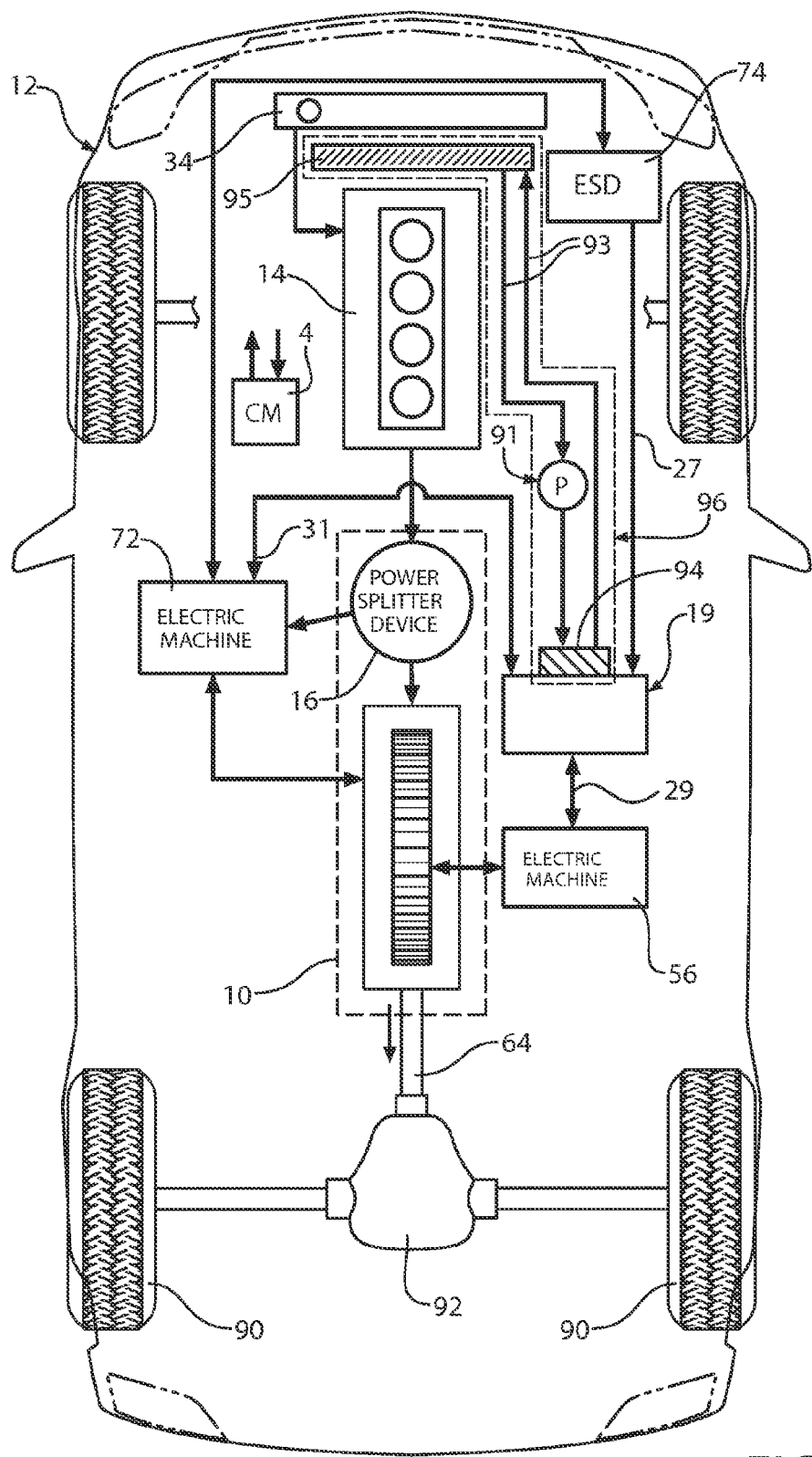
FIG. 1 is a schematic diagram of an exemplary powertrain, in accordance with the present disclosure.
Figure 2:
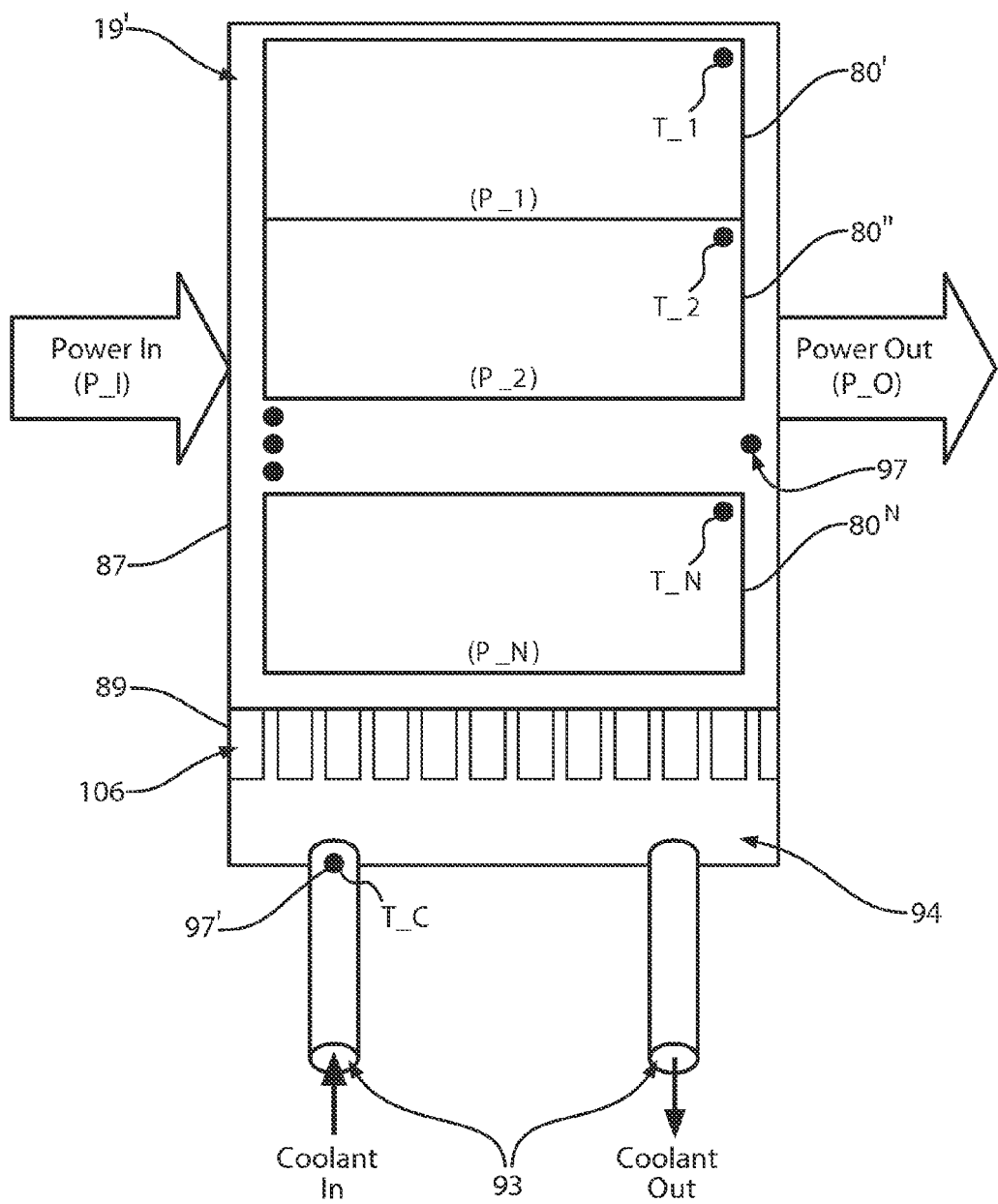
FIG. 2 is a schematic diagram of an exemplary traction power inverter control module, in accordance with the present disclosure.

Referring now to the drawings, wherein the showings are for the purpose of illustrating certain exemplary embodiments only and not for the purpose of limiting the same, FIGS. 1 and 2 depict a vehicle system 12 and traction power inverter control module (hereafter 'TPIM') 19 which has been constructed in accordance with an embodiment of the present disclosure. The vehicle system 12 comprises an internal combustion engine 14, electro-mechanical transmission 10, and driveline 92 adapted to transmit tractive torque to vehicle wheels 90. An electric power drive system comprises electric power components or devices including respective first and second electric machines 56 and 72, an electrical energy storage device ('ESD') 74, and power electronics circuit i.e., TPIM 19. The first and second electric machines 56 and 72 comprise motor/generators, each of which converts electric power to mechanical torque and mechanical torque to electrical power via the TPIM 19. The ESD 74 comprises a high-voltage battery system adapted to store electrical energy and transmit electrical power to the electric machines 56 and 72 via the TPIM 19. The ESD 74 and the first and second electric machines 56 and 72 are electrically-operatively coupled for electric power flow therebetween. The engine 14, the first and second electric machines 56 and 72, and the electromechanical transmission 10 are mechanically-operatively coupled to transmit mechanical power therebetween to transmit tractive torque to the driveline 92 and vehicle wheels 90 via output shaft 64, and to transmit mechanical power to one of the first and second electric machines 56 and 72 for electric power generation via a power splitting device 16. A distributed control module ('CM') 4 is adapted to monitor inputs from a plurality of sensing devices (not shown) and execute predetermined algorithms stored therein to control actuators of the various devices to achieve an operator torque request and meet other parameters related to performance, fuel economy, and emissions, among others. The exemplary hybrid powertrain system is configured to execute the control schemes depicted hereinbelow with reference to FIGS. 2 and 3, among various others required for operation of the vehicle system 12.

The exemplary engine 14 comprises a multi-cylinder internal combustion engine selectively operative in several states to transmit torque to the transmission 10, and can be either a spark-ignition or a compression-ignition engine. The exemplary electromechanical transmission 10 preferably operates in one of several operating range states comprising fixed gear operation and continuously variable operation to transmit torque between the engine 14, the first and second electric machines 56 and 72, and output shaft 64.

The first and second electric machines 56 and 72 preferably comprise three-phase AC machines, each including a stator (not shown) and a rotor (not shown), and respective resolvers (not shown). The motor stator for each machine is grounded to an outer portion of a transmission case (not shown), and includes a stator core with coiled electrical windings extending therefrom. The rotor for the first electric machine 56 is supported on a hub plate gear that is operatively attached to shaft (not shown) via the second planetary gear set (not shown). The rotor for the second electric machine 72 is fixedly attached to a sleeve shaft hub (not shown).

The first and second electric machines 56 and 72 comprise three-phase AC machines and include a stator, a rotor, and a resolver assembly, all not shown. The motor stator for each machine is grounded to an outer portion of the transmission case, and includes a stator core with coiled electrical windings extending therefrom. Each resolver assembly comprises a variable reluctance device including a resolver stator, operatively connected to the stator for each electric machine 56 and 72, and a resolver rotor, operatively connected to the rotor for each electric machine 56 and 72 described above. Each resolver comprises a sensing device adapted to sense rotational position of the resolver stator relative to the resolver rotor, and identify the rotational position.

The ESD 74 is high voltage DC-coupled to the TPIM 19 via DC transfer conductors 27. The TPIM 19 transmits electrical power to and from the first electric machine 56 by the transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$.

Figure 3:
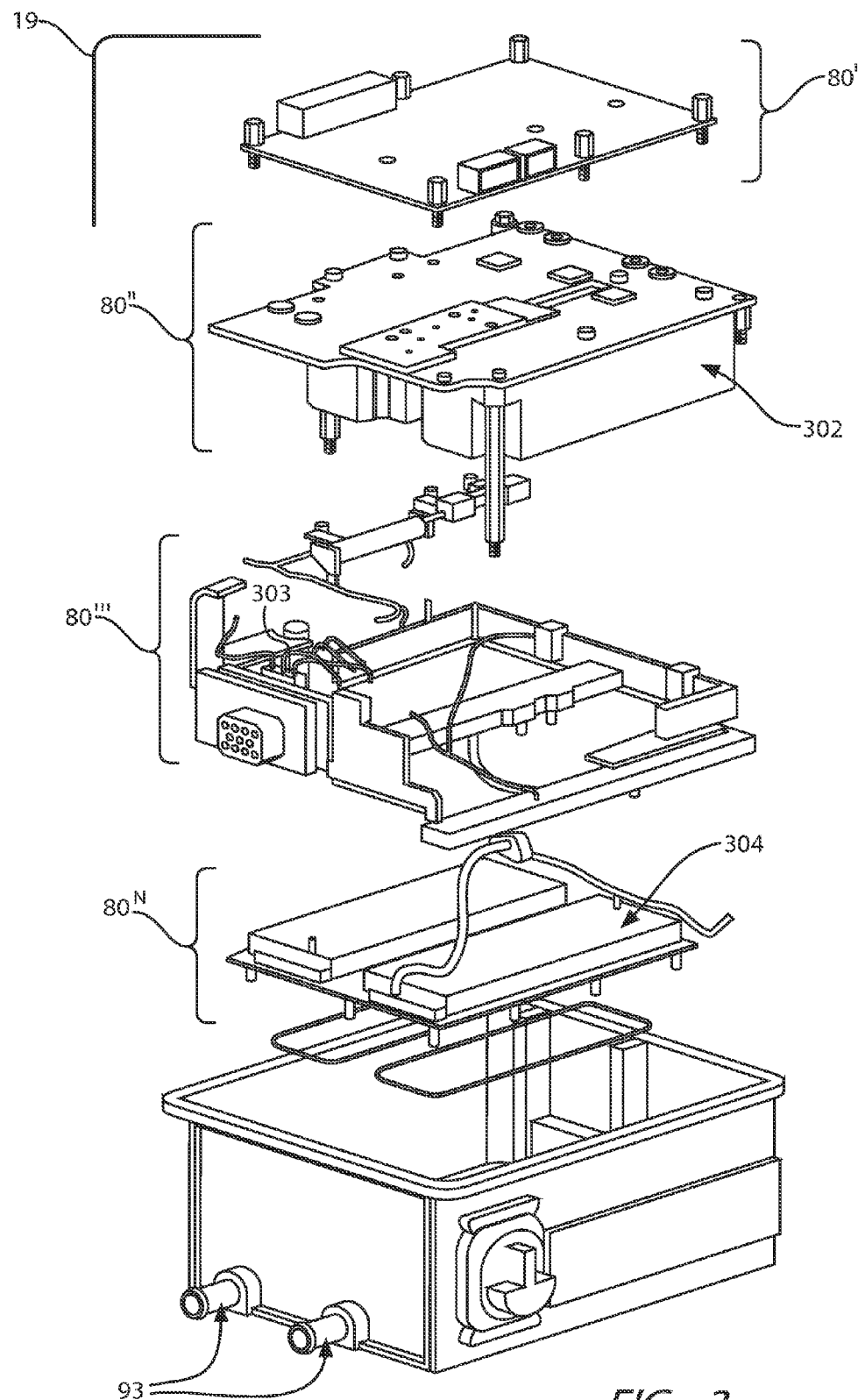
FIG. 3 is a model of an exemplary traction power inverter control module, in accordance with the present disclosure.

FIG. 2 graphically illustrates a power electronics device 19' comprising a multilayer circuit operative to control electric power flow. FIG. 3 illustrates an embodiment of the power electronic device 19', comprising the TPIM 19 of the powertrain system described with reference to FIG. 1. The power electronics device 19' includes a multi-sectioned housing unit adapted to contain multiple electric circuit layers, each having a plurality of electrical and electronic components. The housing unit includes a first section 87, a second section 89, and an electrical connection (not shown). The electrical connection provides opening(s) for feedthrough of power, control and data cables into the first section 87. There is a fluidic connection for feedthrough of liquid coolant to the second section 89, which comprises the coolant manifold 106 including a thermal interface device 94 The first section 87 of the housing contains the multilayer circuit. In the embodiment shown, there is a first electric circuit layer 80' comprises motor control modules configured to receive torque commands and control inverter states therefrom. A second electric circuit layer 80" comprises a plurality of electric filter-capacitors 302. A third electric circuit layer 80''' comprises electric communication gates 303. An Nth electric circuit layer 80$^N$, includes a plurality of semiconductor power modules 304. The power modules may include insulated gate bipolar transistors (IGBTs) and diodes preferably for high voltage conditions e.g., 300 volts, and MOSFETs for lower voltage conditions e.g., less than 300 volts. Each of the power modules are thermally coupled to the thermal interface device 94.

The power electronics device 19' can have critical temperature locations in each of the electric circuit layers of the multilayer circuit 80. The critical temperature locations comprise component/circuit junctions, components, and other locations at which an excess temperature can affect performance or durability of the multilayer circuit 80. Temperatures for each of the critical temperature locations ('T_1'), ('T_2'), and ('T_N') are predicted as described hereinbelow. Each of the electric circuit layers 80', 80", and 80$^N$, can be described in terms of power loss, thermal impedance, and specific heat.

Other electronic devices in the power electronics device 19', can include temperature sensing devices and electrical current sensing devices (not shown). Thermistors (not shown) are included on each of the plurality of IGBTs. The thermistors are signally connected to the control module 5. Temperature sensor 97 monitors temperature at a specific location within the first section 87 of the housing unit and temperature sensor 97' monitors temperature of coolant fluid entering the second section 89 of the housing unit to determine temperature states thereof. Signal outputs of the temperature sensors 97 and 97' are input to the control module 4. The control module determines a state of the temperature in the first section 87 based upon the input from temperature sensor 97 ('T_A') and determines a state of the temperature in the second section 89 based upon the input from the second temperature sensor 97' ('T_C').

The power inverters comprise known complementary three-phase power electronics devices, and each includes a plurality of power modules for converting DC power from the ESD 74 to AC power for powering respective ones of the first and second electric machines 56 and 72, by switching at high frequencies. The power modules form a switch mode power supply configured to receive control commands. There is preferably one pair of power modules for each phase of each of the three-phase electric machines. States of the power modules are controlled to provide motor drive mechanical power generation or electric power regeneration functionality. The three-phase inverters receive or supply DC electric power via respective ones of the DC transfer conductors 27 and transform it to or from three-phase AC power, which is conducted to or from the first and second electric machines 56 and 72 for operation as motors or generators via transfer conductors 29 and 31 respectively.

The thermal interface device 94 preferably comprises a fin-type radiant heat exchanger 106 located in the housing in a manner that the fins are exposed in the coolant manifold of the second section, while the power switching devices are fluidly sealed therefrom, preventing exposing the power switching devices to the coolant fluid. The second section 89 comprises the thermal interface device 94, consisting of the fin-type radiant heat exchanger 106 and the coolant manifold fluidly sealed in the second section of the housing. The second section of the housing includes a fluidic inlet and outlet, and the coolant manifold comprises a fluidic passage which exposes the fin-type radiant heat exchanger 106 to coolant fluid.

A heat transfer circuit 96 preferably comprises a closed fluidic circuit including a heat transfer or fluid/air radiator device 95 that is preferably separate from a main vehicle radiator 34 used for cooling the engine 14. One skilled in the art will recognize that the fluid air radiator device 95 may be incorporated within the main vehicle radiator 34 while remaining within the scope of that which is claimed. The fluid/air radiator device 95 is fluidly connected to, and forms a fluid circuit with, a thermal interface device 94 of the TPIM 19 via coolant lines 93. A pump device 91, such as an electrically actuated pump, pumps or circulates fluid, e.g., an ethylene glycol based coolant, within the heat transfer circuit 96. The pump device 91 preferably comprises a variable flow device having a flow rate controlled via a pulsewidth-modulated electric circuit. Operation of the pump device 91, and therefore pump flow rate, is preferably controlled via a pulsewidth-modulated (PWM) signal output from the control module 4 as a function of operating conditions, e.g., temperature measured at the inverter, ambient temperature and electrical load. The high-voltage ESD 74 and the stators of the electric machines 56 and 72 include the thermal interface device 94 that connects to the heat transfer circuit 96, or, alternatively, are on separate cooling circuits. The thermal interface device 94 preferably comprises a heat exchange device thermally connected to a coolant manifold (not shown).

The volume and frontal area of the fluid/air radiator device 95 and the flow capacity of the pump device 91 are determined based upon the amount of heat rejection from the TPIM 19 through the thermal interface device 94. The fluid/air radiator device 95 is sized such that the heat generation of the TPIM 19 operating at a low electrical efficiency point is less than system heat rejection through the fluid/air radiator device 95 at a maximum ambient temperature, e.g., 35-40° C.

The control module 4 comprises a distributed control module architecture which provides coordinated system control of the powertrain system described herein, and is a subset of an overall vehicle control architecture. The control module 4 synthesizes pertinent information and inputs, and executes algorithms to control various actuators to achieve control targets, including such parameters as fuel economy, emissions, performance, driveability, and protection of hardware, including batteries contained within the ESD 74 and the first and second electric machines 56 and 72. The distributed architecture preferably includes an engine control module, transmission control module, battery pack control module, the TPIM 19, and a hybrid control module, which provides supervisory control and coordination of the aforementioned control modules. A user interface, not shown, is operatively connected to a plurality of devices through which a vehicle operator preferably controls or directs operation of the powertrain including the transmission 10. Such operator driven control signals may include an operator torque request and operator brake. Exemplary input devices to the user interface include an accelerator pedal, a brake pedal, a transmission gear selector, and a vehicle speed cruise control, all of which are not shown. Each of the aforementioned control modules communicates with other control modules, sensors, and actuators via a local area network which allows for structured communication of control parameters and commands between the various control modules.

The control module 4 and the motor control modules in the power electronics device 19' each preferably comprises a general-purpose digital computer comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using a local area network communication system and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

During powertrain operation, a quantity of electrical power is converted to heat in the power electronics device 19'. Electrically generated heat can be caused by e.g., switching losses in the inverter electronics, ohmic ($I^2R$) losses and motor losses occurring predominantly in motor windings. Heat generated in or transferred to the power electronics device 19' may raise the temperature of all of the components in the power electronics device 19', thereby posing a risk of thermal damage to electrical components therein. Thermal damage can occur at a particular point in a component when the temperature at that point exceeds the thermal limit of a particular material or structure of the component. Additionally, different operating conditions of the overall application in which the power electronics device 19' is used may lead to localized increased temperatures in particular components. Therefore, it is advantageous for a thermal energy management strategy to compensate for thermal limits of electrical components or electrical layers of the power electronics device 19' and compensate for different temperatures within the power electronics device 19'.

A method for managing thermal energy in the power electronics device 19' comprises monitoring a plurality of temperature sensors and electric power loss at predetermined locations in the electric circuit layers 80, 80', 80"..., 80''' predicting temperatures for the plurality of electric circuit layers, or alternatively electric components, controlling electric power flow into the power electronics device 19', controlling coolant flow, and controlling operation of the powertrain system, including controlling operation of the first and second electrical machines 56 and 72 based upon the predicted temperatures is described. The control module 4 monitors the first and second temperature sensing devices 97 and 97'.

The control module 4 determines electrical power in ('P_I') and out ('P_O') of the TPIM 19. One skilled in the art will appreciate multiple methods to determine the electrical power in and out of the TPIM 19 including methods based upon monitored electrical current and electrical voltage into and out of the power electronics device 19'. The control module 4 determines electrical power losses for each of the electric circuit layers 80, 80', and 80" within the TPIM 19 including the first layer power loss ('P_1'), the second layer power loss ('P_2'), and the Nth layer power loss ('P_N'). One skilled in the art will appreciate multiple methods to determine an electrical power loss including a method based upon monitoring electrical current into and out of an electric circuit layer and monitoring electrical voltage across the electric circuit layer.

Alternatively, the control module 4 monitors electric power flow through one or more electric power components or devices to determine electric power loss on each of the electric circuit layers 80, 80', and 80". One skilled in the art will appreciate that electrical power losses for each electric circuit layer may be modeled based upon a function of electrical power into and out of the TPIM 19 and/or electric power flow through one or more electric power components.

Each of the electric circuit layers of the electric circuit 80 includes electrical components with varying operational temperature ranges including a maximum rated operating temperature. A predetermined electrical component with a lowest maximum rated operating temperature is selected as a critical temperature location. Predicting temperatures on the critical temperature locations, i.e., electric circuit layers and/or electrical components, are based upon coolant temperature, ambient temperature, other measured temperatures in the electric circuit layer, electric power loss of the electric circuit layer, thermal impedance of the electric circuit layer, and specific heat of the electric circuit layer. The relationship may be expressed as in Eq. 1:

$$T_{junction} = f(T_{coolant}, T_{ambient}, T_{other}, P_{loss}, R_{th}, C_{th}) \quad [1]$$

wherein $T_{coolant}$ represents coolant temperature out of the TPIM 19, $T_{ambient}$ represents ambient temperature within the TPIM 19, $T_{other}$ represents measured temperatures in the electric circuit layer, $P_{loss}$ represents electric power loss of the electric circuit layer, $R_{th}$ represents thermal impedance of the electric circuit layer, and $C_{th}$ represents specific heat of the electric circuit layer.

Predicting the temperatures for the critical temperature locations is based upon the monitored plurality of temperature sensors, the electrical power into and out of the power electronics device 19', the electrical power losses for each of the electric circuit layers 80, 80', and 80", and known parametric values corresponding to thermal impedance and specific heat on each of the electric circuit layers 80, 80', and 80". The critical temperature locations of the power electronics device 19' can be represented by Eq. 2:

$$\begin{bmatrix} T\_1 \\ T\_2 \\ \ldots \\ \ldots \\ T\_N \end{bmatrix} = \begin{bmatrix} A_1 & B_1 & C_1 \\ A_2 & B_2 & C_2 \\ \ldots & \ldots & \ldots \\ \ldots & \ldots & \ldots \\ A_N & B_N & C_N \end{bmatrix} \cdot \begin{bmatrix} T\_A \\ T\_C \\ T\_th \end{bmatrix} + [\alpha_1 \ \alpha_2 \ \ldots \ \ldots \ \alpha_N] \cdot \begin{bmatrix} PL\_1 \\ PL\_2 \\ \ldots \\ \ldots \\ PL\_N \end{bmatrix} \quad [2]$$

wherein T_1, T_2, ..., T_N represent critical temperature locations on the electric circuit layers and/or electrical components 1 to N, T_A represents the temperature in the power electronics device 19' measured from the first temperature sensing device 97, T_C represents the coolant temperature into the TPIM 19 measured from the second temperature sensing device 97', T_th represents an additional measured temperature, e.g., average thermistor temperature, PL_1, PL_2, ..., PL_N represent electrical power loss on each of the electric circuit layers and/or the electrical components e.g., the plurality of electric circuit layers 80', 80", ..., 80$^N$, $A_1, B_1, C_1, \ldots A_N, B_N, C_N$, represent parametric values corresponding to thermal impedance and specific heat on each of the electric circuit layers and/or electrical components e.g., electric circuit layers 80', 80", ..., 80$^N$, and $\alpha_1, \alpha_2, \ldots \alpha_N$ represent known parametric values corresponding to thermal impedance and specific heat on each of the electric circuit layers and/or electrical components e.g., the electric circuit layers 80', 80", ..., 80$^N$.

One skilled in the art recognizes that the method hereinabove for managing thermal energy in the power electronics device 19' based upon predicted temperatures for the plurality of electric circuit layers may alternatively be based upon predicted temperatures for a plurality of electrical components within the TPIM 19. Electrical power losses for the electrical components may be modeled based upon the monitored electrical power into and out of the power electronics device 19'. The control module 4 executes a computer program to predict the temperatures for the plurality of electrical components. The predicted temperatures for the plurality of electrical components are based upon the monitored plurality of temperature sensors, the electrical power into and out of the power electronics device 19', and the electrical power losses for each of the electrical components.

The predicted temperatures of the plurality of electric circuit components or electrical layers can be used by algorithms within control module 4. These algorithms include predetermined threshold temperatures, to impose torque control parameters on the first and second electrical machines 56 and 72. When the predicted temperatures are under the predetermined threshold temperature, a maximum continuous torque function is applied to the first and second electrical machines 56 and 72 as a function of temperature condition of the TPIM 19 which effectively makes available torque up to the torque capability of the electric motor. When the predicted temperatures exceed the predetermined temperature threshold the maximum continuous torque function is attenuated as described further herein below.

When the predicted temperature exceeds a predetermined temperature threshold, the maximum continuous torque function introduces an increasingly restrictive torque reduction factor, thereby reducing the motor power throughput. As the predicted temperatures exceed the predetermined threshold temperature, the attenuation of motor torque increases. In the event that the predicted temperature exceeds a critical predetermined threshold, the control module 4 may shut off the first and second electrical machines 56 and 72. The shut off permits the first and second electrical machines 56 and 72 to dissipate heat leading to reduced temperatures in the TPIM 19. The shut off event may end when control module 4 determines that the predicted temperature of the TPIM 19 decreases to a second predetermined threshold. Torque attenuation of one motor may be redistributed to the other motor, to the engine 14 or split therebetween in accordance with the overall control strategy of the hybrid drive system while achieving the operator torque request.

The predicted temperatures may additionally be used to control the cooling system and a coolant flow rate. Operation of the pump device 91 may be determined based upon the predicted temperatures. As the predicted temperatures increase the control module 4 may increase the coolant flow rate to cool the TPIM 19 via the thermal interface device 94. As the predicted temperatures decrease, the control module 4 may decrease the coolant flow rate.

A further aspect of the present disclosure comprises using the predicted temperatures to control thermal stresses within the power electronics device 19'. During operations, the predicted temperature of any one of the electrical layers may reach a predetermined threshold temperature prior to a plurality of remaining electrical layers achieving respective predetermined threshold temperatures. Electric signal modulation may be controlled within the power electronics device 19' to change electrical power flow into the respective electrical layers thereby transferring thermal stress to the electrical layers that are at temperatures which precede the respective predetermined threshold temperatures. For the TPIM 19, the predicted temperatures may be used to control electric signal modulation strategies. When the predicted temperature of the plurality of electric filter-capacitors 302 on the second electric circuit layer 80" exceeds a predetermined temperature threshold, a switching frequency of the semiconductor power modules 304 on the Nth electric circuit layer may be increased. The increased switching frequency decreases the thermal stress of the electric filter-capacitors 302 and increases the thermal stress on the semiconductor power modules 304. When the predicted temperature of the semiconductor power modules 304 exceeds a predetermined temperature threshold, the switching frequency of the semiconductor power modules 304 may be decreased to lower the thermal stress of the semiconductor power modules 304 thereby transferring the thermal stress to the electric filter-capacitors 302.

Additionally, the predicted temperature of the plurality of electric circuit components or electrical layers can be used to determine temperature sensor fault diagnostics and execute adaptive controls in the control module 4. If a temperature sensor is determined to be malfunctioning, the control module 4 can operate to impose a predetermined maximum continuous torque function as a function of electric motor angular velocity in order to decrease the likelihood of thermal damage until the temperature sensor can be replaced.

It is understood that modifications are allowable within the scope of the disclosure including applying the method described hereinabove is applicable to a control scheme comprising predicting temperatures of electric components. The control system architecture is applicable to alternative hybrid powertrain systems having multiple torque generative devices, including, e.g., a hybrid powertrain system having an engine and a single electric machine and a hybrid powertrain system having an engine and multiple electric machines. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for managing thermal energy in a power electronics device for a hybrid powertrain system comprising an engine and an electric machine, the power electronics device including a plurality of electric circuit layers and a cooling system, the method comprising:
    monitoring a plurality of temperature sensors in the power electronics device;
    monitoring electric power into and out of the power electronics device;
    predicting temperatures for the plurality of electric circuit layers;
    controlling the hybrid powertrain system based upon the predicted temperatures for the plurality of electric circuit layers and modulating electric signals within the power electronics device based upon the predicted temperatures for the plurality of electric circuit layers, wherein a first electric circuit layer comprises a plurality of electric filter-capacitors and a second electric circuit layer comprises a plurality of semiconductor power modules; and
    increasing a switching frequency of the semiconductor power modules when the predicted temperature of the first electric circuit layer exceeds a predetermined temperature threshold.

2. The method of claim 1, wherein controlling the hybrid powertrain system further comprises controlling the electric machine based upon the predicted temperatures for the plurality of electric circuit layers.

3. The method of claim 2, further comprising:
    monitoring an operator torque request;
    determining a restrictive torque reduction factor based upon the predicted temperatures; and
    controlling the electric machine based upon the operator torque request and the restrictive torque reduction factor.

4. The method of claim 3, further comprising:
    shutting the electric machine off when the restrictive torque reduction factor exceeds a predetermined threshold.

5. The method of claim 1, wherein the cooling system comprises an intake and an outtake channel and is operative to cycle coolant into and out of the power electronics device.

6. The method of claim 5, wherein the plurality of temperature sensors comprises a first temperature sensor operative to monitor ambient conditions within the power electronics device and a second temperature sensor operative to monitor intake coolant temperature into the power electronics device.

7. The method of claim 6, wherein predicting temperatures for the plurality of electric circuit layers is based upon the first and second temperature sensors, the electrical power into and out of the power electronics device, and known parametric values corresponding to thermal impedance and specific heat on each of the electric circuit layers.

8. The method of claim 1, further comprising:
    determining electrical power losses for each of the electric circuit layers based upon the monitored electric power into and out of the power electronics device.

9. The method of claim 8, wherein predicting temperatures for the plurality of electric circuit layers is based upon the monitored plurality of temperature sensors, the electrical power losses for each of the electric circuit layers, and known parametric values corresponding to thermal impedance and specific heat on each of the electric circuit layers.

10. The method of claim 1, wherein controlling the hybrid powertrain system further comprises controlling coolant flow rate based upon the predicted temperatures for the plurality of electric circuit layers.

11. The method of claim 10, further comprising:
    increasing the coolant flow rate when the predicted temperatures increase and decreasing the coolant flow rate when the predicted temperatures decrease.

12. The method of claim 1, further comprising:
    decreasing a switching frequency of the semiconductor power modules when the predicted temperature of the second electric circuit layer exceeds a predetermined temperature threshold.

13. The method of claim 1, wherein predicting temperatures for the plurality of electric circuit layers is based upon the monitored plurality of temperature sensors, the electrical power into and out of the power electronics device, and known parametric values corresponding to thermal impedance and specific heat on each of the electric circuit layers.

14. A method for managing thermal energy in a power electronics device for a hybrid powertrain system comprising a plurality of torque generative devices, the power electronics device including a plurality of electric circuit layers and a cooling system, the method comprising:
    monitoring a plurality of temperature sensors in the power electronics device;
    monitoring electric power into and out of the power electronics device;
    predicting temperatures for the plurality of electric circuit layers;
    controlling the hybrid powertrain system based upon the predicted temperatures for the plurality of electric circuit layers and modulating electric signals within the power electronics device based upon the predicted temperatures for the plurality of electric circuit layers, wherein a first electric circuit layer comprises a plurality of electric filter-capacitors and a second electric circuit layer comprises a plurality of semiconductor power modules; and controlling the plurality of torque generative devices based upon the predicted temperatures for the plurality of electric circuit layers including increasing a switching frequency of the semiconductor power modules when the predicted temperature of the first electric circuit layer exceeds a predetermined temperature threshold.

15. The method of claim 14, wherein predicting temperatures for the plurality of electric circuit layers is based upon the monitored plurality of temperature sensors, the electrical power into and out of the power electronics device, and known parametric values corresponding to thermal impedance and specific heat on each of the electric circuit layers.

16. The method of claim 14, wherein controlling the hybrid powertrain system further comprises controlling coolant flow rate based upon the predicted temperatures for the plurality of electric circuit layers.

* * * * *